United States Patent
Kandlikar et al.

(10) Patent No.: US 7,716,176 B1
(45) Date of Patent: May 11, 2010

(54) METHOD AND AN APPARATUS TO FILTER AUTOSUPPORT DATA

(75) Inventors: Yogesh Kandlikar, Sunnyvale, CA (US); Larry Lancaster, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 293 days.

(21) Appl. No.: 11/325,088

(22) Filed: Jan. 3, 2006

(51) Int. Cl.
*G06F 7/00* (2006.01)
(52) U.S. Cl. ..................................... 707/607
(58) Field of Classification Search .............. 707/2, 707/4, 6, 7
See application file for complete search history.

(56) References Cited

U.S. PATENT DOCUMENTS

| | | | |
|---|---|---|---|
| 2002/0161861 A1* | 10/2002 | Greuel | 709/220 |
| 2005/0050054 A1* | 3/2005 | Clark et al. | 707/100 |
| 2005/0187940 A1* | 8/2005 | Lora et al. | 707/10 |
| 2005/0195741 A1* | 9/2005 | Doshi et al. | 370/230 |

OTHER PUBLICATIONS

Unknown Author, Network Appliance Delivers Support Solution Designated Exclusively for Government Agencies, www.netapp.com/news/press/news_rel_20050718?fmt=pring, 2 pages total, Sep. 14, 2005.
Unknown Author, NetApp SupportEdge Introducing SupportEdge Secure for Government, www.netapp.com/support/supportedge-secure.?fmt=print, 2 pages total, Sep. 14, 2005.
Unknown Author, SupportEdge Secure for Government, Global Services Solutions, NetApp Global Services, www.netapp.com, 2 pages total, unknown date.

* cited by examiner

*Primary Examiner*—Charles Rones
*Assistant Examiner*—Fazlul Quader
(74) *Attorney, Agent, or Firm*—Blakely, Sokoloff, Taylor & Zafman LLP

(57) ABSTRACT

A method and an apparatus to filter autosupport data are presented. In one embodiment, the method includes filtering autosupport data from a storage appliance using criteria provided by a user, with relational integrity of the autosupport data protected. The method may further include exporting the filtered autosupport data to a public network to be uploaded to a portal server over the public network.

24 Claims, 5 Drawing Sheets

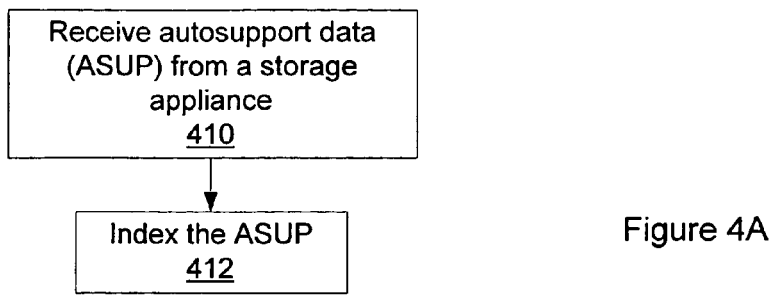
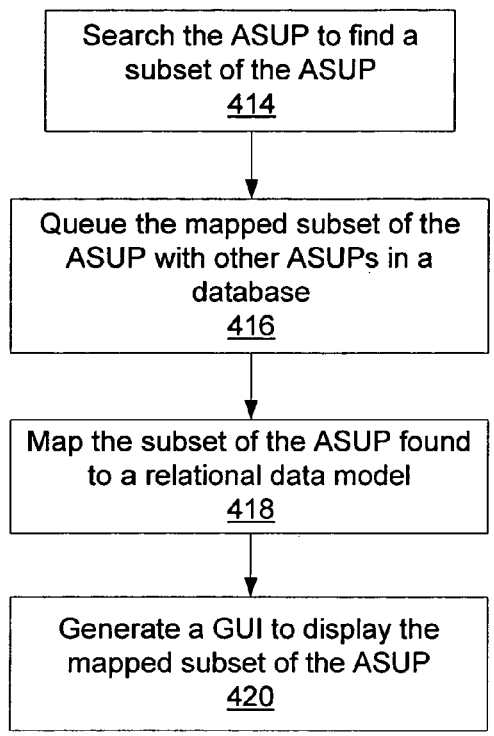
Figure 4A
Figure 4B
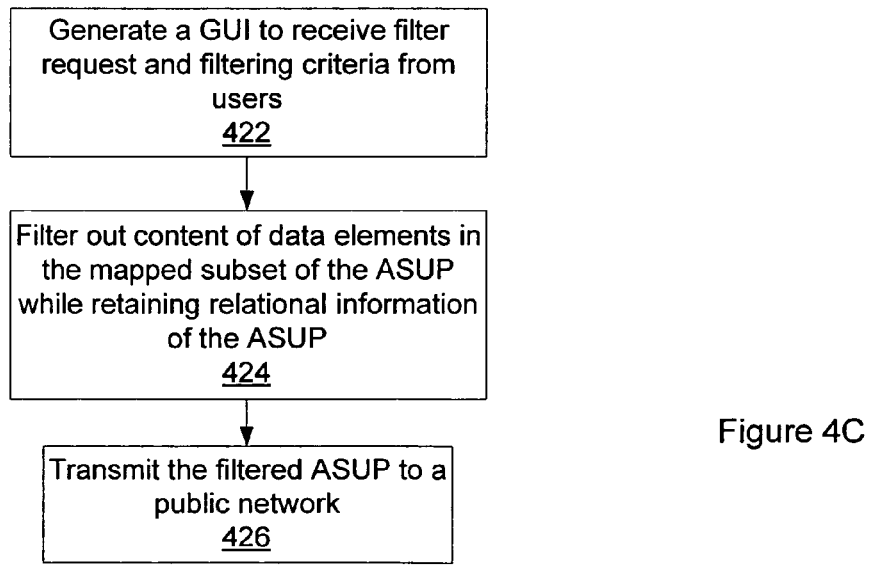
Figure 4C

500

| | | | | | View Filters | Log Out |
Welcome admin (Administrator)

AutoSupport Queue

Data Packet ID:
ExportPacket-MonSep1916:13:042005      [ ] Purge to Date

79 AutoSupports in Queue      Pages: [1] 2 3 4 5 6 7 8

Select All AutoSupports in the Queue: ☐      510      [Purge From Queue] [Export DataPack]

| | Pending Autosupport | Hostname | SystemID | Model | Subject |
|---|---|---|---|---|---|
| ☐ | 20050805129.xml (511) | XXXXXXXX | 3001983 | C1200 | System Notification (CLIENT APP INFO Backup: SME3.1 Version 3.1: (142) on BOXFISH: SnapManager for Ex) INFO |
| ☐ | 20050805240.xml | atpnas01 | 0033622540 | F825 | Cluster Notification (CLIENT APP INFO Snapshot event SnapDrive 3.1: (134) on NCHP76YA: For the descri) INFO |
| ☐ | 20050805305.xml (514) | dub36201 | 0050391928 | C2100 | Cluster Notification (CLIENT APP ALERT Snapshot Monitor event SnapDrive 3.1: (115) on PSQ-DB-02: For ) CRITICAL |
| ☐ | 20050805489.xml | XXXXXXXX | 0050389909 | C2100 | System Notification (DISK_IO_DEGRADED) WARNING |
| ☐ | 20050805530.xml | wux6be1-nas02 | 0050415033 | FAS960 | Cluster Notification (WEEKLY_LOG) INFO |
| ☐ | 20050825300.xml | nfsarchive401-re2 | 0050409614 | R200 | System Notification (WEEKLY_LOG) INFO |
| ☐ | 20050825414.xml | eng-netapp | 0016794713 | F720 | System Notification (WEEKLY_LOG) INFO |
| ☐ | 20050825533.xml | prc03fc51 | 0050401562 | FAS960 | System Notification (WEEKLY_LOG) INFO |
| ☐ | 200508290.xml | prc03fc51 | 0050401562 | FAS960 | RE: System Notification (REBOOT (panic)) WARNING Call 01.113.296 |
| ☐ | 20050829129.xml | XXXXXXXX | 3001983 | C1200 | System Notification (CLIENT APP INFO Backup: SME3.1 Version 3.1: (142) on BOXFISH: SnapManager for Ex) INFO |

View/Filter Autosupport Elements

[    ] [Search] [Apply Filters] [Clear Applied Filters]

⊞ ADAPTER      521      523      525

⊞ AGGREGATE

⊟ AGGREGATE OPTION

| FIELD | ⊟ expandAll   ⊟ collapseAll | FILTER | CONFIG FILTER | REASON |
|---|---|---|---|---|
| ⊞ aggr_opt_ct ❓ | | ☐ | ☐ | Default |
| ⊞ aggr_opt_name ❓ | | ☐ | ☐ | Default |

Figure 5

METHOD AND AN APPARATUS TO FILTER AUTOSUPPORT DATA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to networked storage systems, and more particularly, to filtering autosupport data.

BACKGROUND

A networked storage system may include a number of storage appliances. A storage appliance may provide services related to the organization of data on mass storage devices, such as disks. Some of these storage appliances are commonly referred to as filers or file servers. An example of such a storage appliance is any of the Filer products made by Network Appliance, Inc. in Sunnyvale, Calif. The storage appliance may be implemented with a special-purpose computer or a general-purpose computer programmed in a particular way. Depending on the application, various networked storage systems may include different numbers of storage appliances.

Networked storage systems have been widely deployed to store sensitive or confidential information for various users, such as government agencies. To prevent hacking or breaking into networked storage systems, these users take great care in safeguarding system environment-related information, such as configuration information of the storage appliances within the system, hostnames and Internet Protocol (IP) addresses of the storage appliances.

Conventionally, storage appliances generate autosupport data, which is information related to the configuration and/or operation of the storage appliances. Thus, autosupport data may include system environment related information of the storage appliances. Vendors of the storage appliances often use the autosupport data to service and/or debug problems in the storage appliances. Because of the sensitive nature of certain system environment related information, some users choose not to send the autosupport data to vendors for service because of security concerns. As a result, when problems arise in these users' storage appliances, vendors do not have the relevant autosupport data and have limited ability to support these users.

SUMMARY

The present invention includes a method and an apparatus to filter autosupport data. In one embodiment, the method includes filtering autosupport data from a storage appliance using criteria provided by a user, with relational integrity of the autosupport data protected. The method may further include exporting the filtered autosupport data to a public network to be uploaded to a portal server over the public network.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 4A-4C illustrate flow diagrams of some embodiments of a process to handle autosupport data; and FIG. 5 illustrates one embodiment of a graphical user interface.

DETAILED DESCRIPTION

A method and an apparatus to filter autosupport data are described. In the following description, numerous specific details are set forth. However, it is understood that embodiments of the invention may be practiced without these specific details. In other instances, well-known components, structures, and techniques have not been shown in detail in order not to obscure the understanding of this description.

In this description, a method and an apparatus to filter autosupport data are presented. In one embodiment, the method includes filtering autosupport data from a storage appliance using criteria provided by a user, while retaining relational information in the autosupport data. Details of the criteria are discussed below. The method may further include exporting the filtered autosupport data to a public network, to be uploaded to a portal server over the public network.

Figure 1:
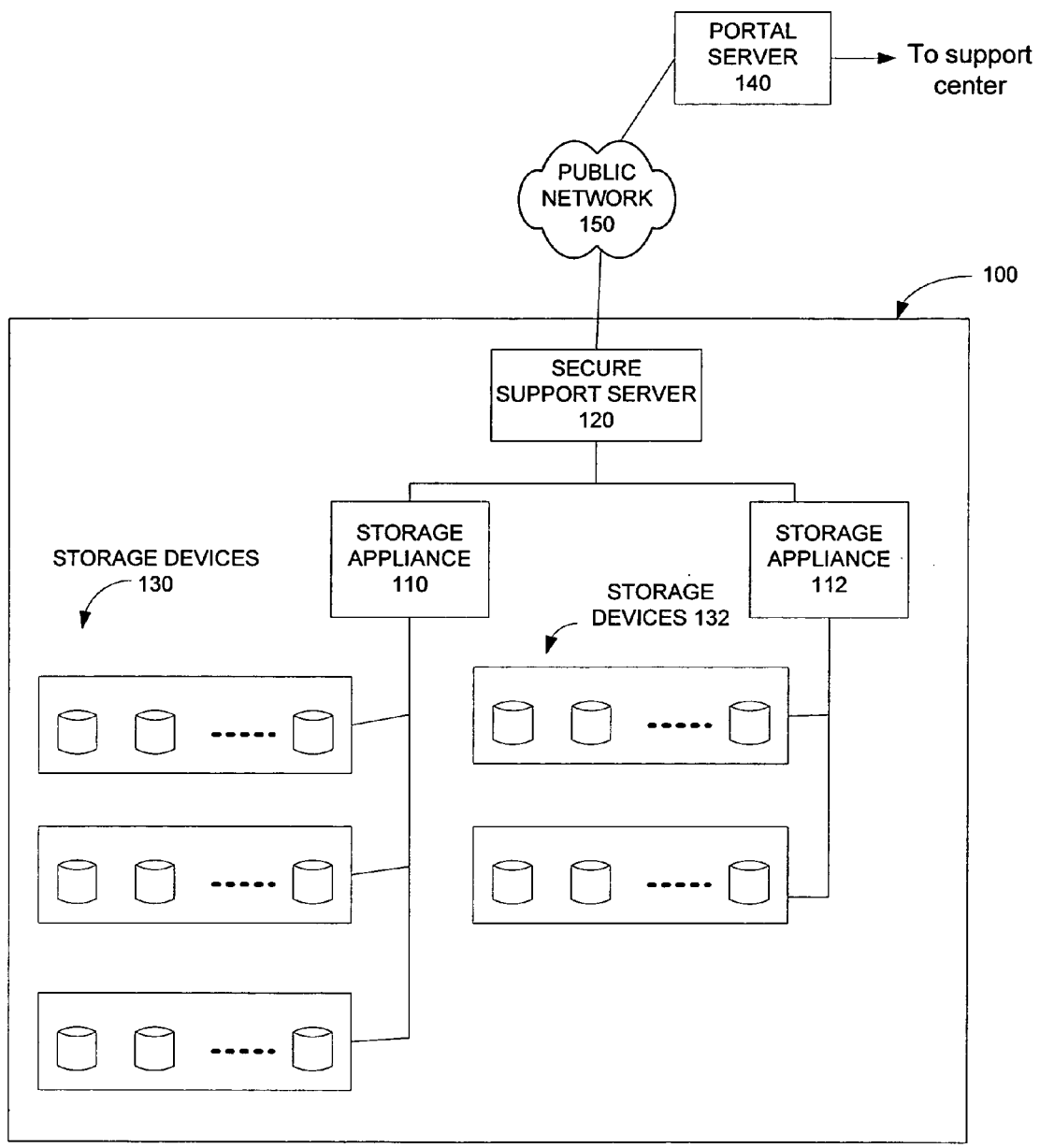
FIG. 1 illustrates an exemplary embodiment of a networked storage system.

FIG. 1 shows a networked storage system 100 usable with some embodiments of the present invention. The system 100 includes two storage appliances 110 and 112, a first set of mass storage devices 130 coupled to the storage appliance 110, a second set of storage devices 132 coupled to the storage appliance 112, and a secure support server 120 coupled to the storage appliance 110 and 112. The two sets of mass storage devices 130 and 132 may include a number of disks (e.g., magnetic disks, optical disks, etc.) organized in volumes. The volumes may include one or more Redundant Array of Independent Disks (RAID) volumes.

In some embodiments, the system 100 is coupled to a public network 150 via the secure support server 120. The public network 150 may include a wide area network (WAN), such as the Internet. To protect the system 100 from being hacked or broken into, the secure support server 120 may filter data to be transmitted from the system 100 to the public network 150 to remove system environment-related information from the data. In particular, users may request to filter autosupport data from the storage appliances 110 and 112 according to some predetermined criteria. For instance, the criteria may include the types of information to be removed, such as hostnames and Internet Protocol (IP) addresses of the storage appliances 110 and 112. In response to user requests, the secure support server 120 filters the autosupport data accordingly. In some embodiments, the secure support server 120 also generates a graphical user interface (GUI) to allow users to view the autosupport data before and/or after applying the filter. More details of the secure support server 120 are discussed below.

In one embodiment, data is stored and transferred in units of files in the system 100. Therefore, the system 100 may be a file-based networked storage system. In one embodiment, the system 100 is a network-attached storage (NAS) system that provides clients with access to data at the file level. The NAS system uses file access protocols to retrieve data, such as, for example, Network File System (NFS), or Common Internet File System (CIFS). The files are logically arranged into directories. A volume of storage devices may be mapped to one or more directories. Alternatively, the system 100 may include or be part of a storage area network (SAN), to provide clients with access to data at the block level of the storage appliances 110 and 112. A block is the basic unit of data used to store data in the SAN.

Note that any or all of the components of system 100 and associated hardware may be used in various embodiments of the present invention. However, it can be appreciated that other configurations of the networked data storage system may include more or fewer devices discussed above.

Figure 2:
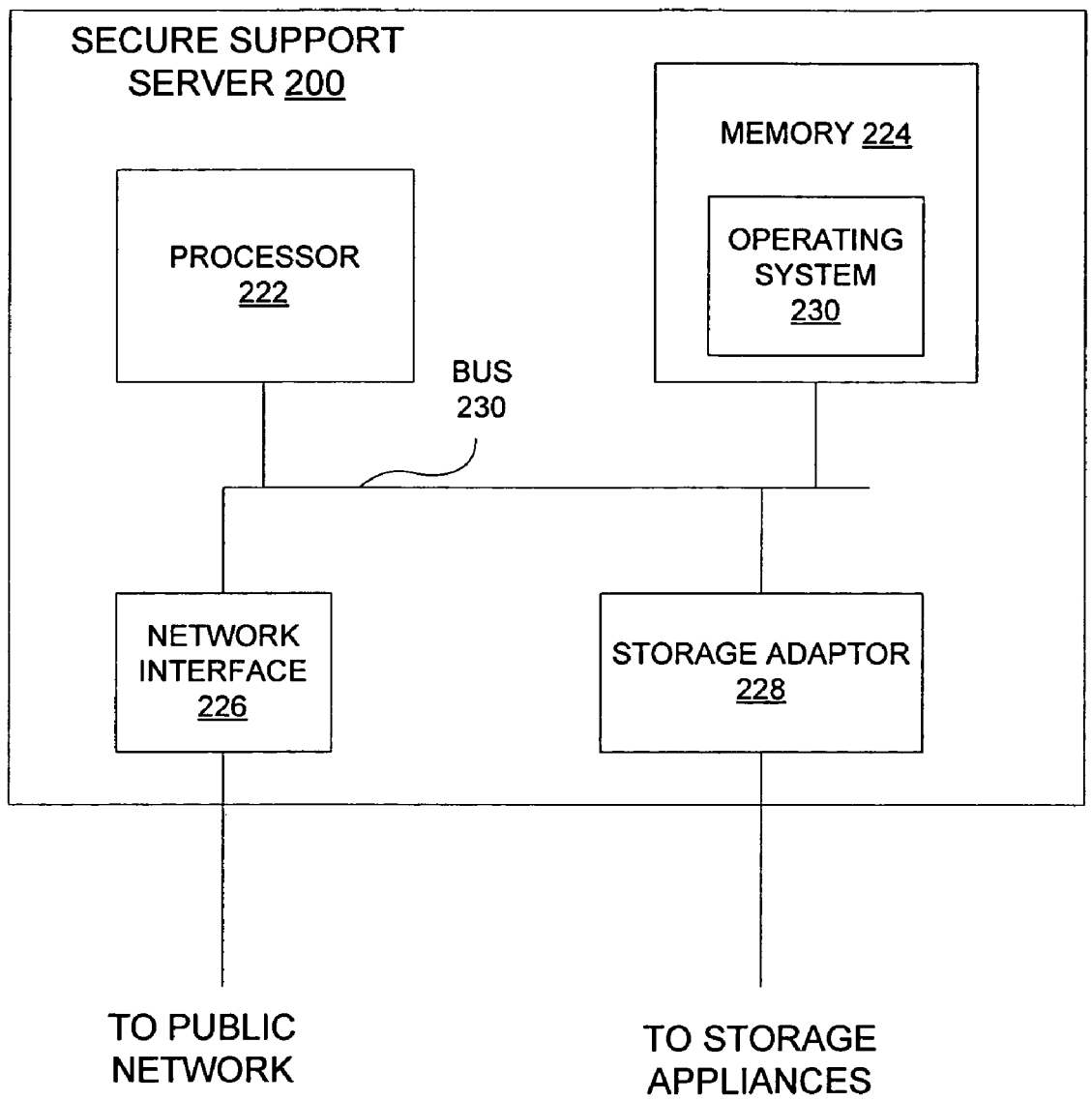
FIG. 2 illustrates one embodiment of a secure support server.

One embodiment of a server usable to implement the secure support server 120 is illustrated in FIG. 2. Referring to FIG. 2, the secure support server 200 includes a processor 222, a memory 224, a network interface 226, and a storage adaptor 228, which are coupled to each other via a bus system 230. The bus system 230 may include one or more busses and/or interconnects. In one embodiment, the secure support server 200 communicates with a public network (e.g., the Internet) via the network interface 226, which can be an Ethernet adaptor, fiber channel adaptor, etc.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of an operating system 230. The processor 222 may retrieve the instructions from the memory 224 to run the operating system 230. The secure support server 200 interfaces with the storage appliances (e.g., the storage servers 110 and 112) via the storage adaptor 228, which can be a SCSI adaptor, fiber channel adaptor, etc.

Figure 3:
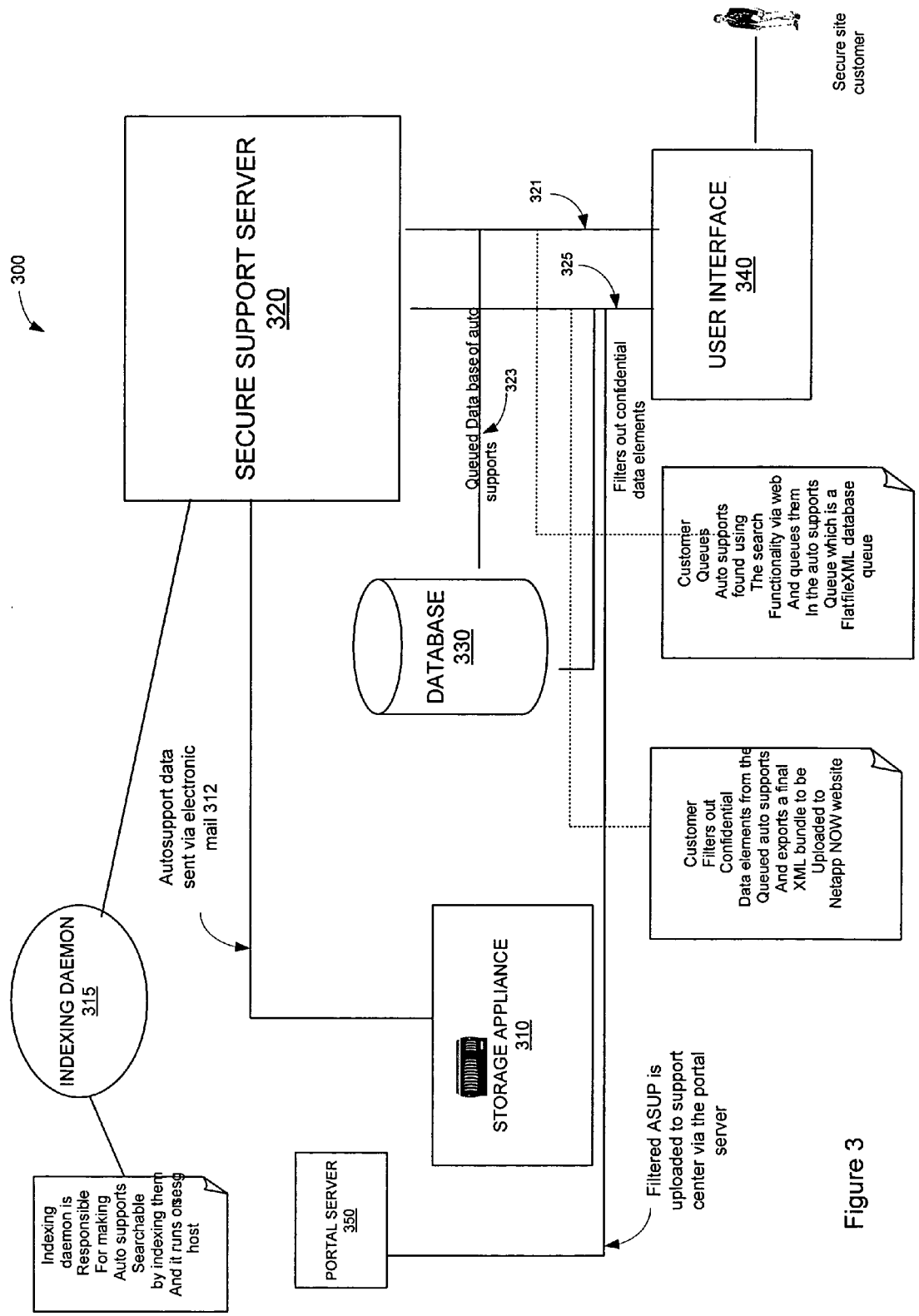
FIG. 3 illustrates a functional diagram of one embodiment of a networked storage system.

FIG. 3 illustrates a functional diagram of one embodiment of a networked storage system 300. The system 300 includes a storage appliance 310, a secure support server 320, a database 330, and a user interface module 340. The storage appliances 310 are coupled to the secure support server 320. The secure support server 320 is further coupled to the database 330, the user interface module 340, and a portal server 350 via a public computer network (e.g., the Internet). The database 330 may include different types of database in different embodiments, such as flat-file database, relational database, etc. Data may be transmitted from the system 300 via the secure support server 320 to the portal server 350. Note that only one storage appliance 310 is shown in FIG. 3 to simply the illustration. However, it should be appreciated that the system 300 may include multiple storage appliances in different embodiments.

In one embodiment, the storage appliance 310 may collect information from itself to generate autosupport data during operation. In general, autosupport data (also known as ASUP data) from a storage appliance is information related to configuration and operation of the storage appliance, such as configuration data of the storage appliance, log files generated by the storage appliance, operational statistics of the storage appliance, etc. Autosupport data is commonly used in maintaining and/or servicing the storage appliance. Autosupport data generally includes a number of data elements, which are logical units of data within the autosupport data. The data elements may be defined to be of different sizes and types. Examples of the data elements are IP addresses of storage appliances, log files generated by the storage appliances, etc.

Referring back to FIG. 3, the storage appliance 310 sends autosupport data to the secure support server 320 via various ways, such as via electronic mail 312. The secure support server 320 couples the system 300 to networks and/or components (e.g., the portal server 350) outside of the system 300. Autosupport data from the system 300 is transmitted to public networks via the secure support server 320. To protect sensitive or confidential information, the secure support server 320 is capable of filtering the autosupport data before transmitting the autosupport data to a public network. Such protection is particularly important for government agencies, for example, because autosupport data may contain sensitive system environment related information of the agencies' networked storage systems (e.g., Internet Protocol (IP) addresses of storage appliances). Hackers who are able to obtain such information may be able to hack into the systems of these agencies readily.

In some embodiments, the secure support server 320 runs an indexing daemon 315 to index the autosupport data received to make the autosupport data searchable. The indexing daemon 315 may convert the autosupport data into a format optimized for searching data. The secure support server 320 also runs a user interface module 340. The user interface module 340 generates a user interface (e.g., a graphical user interface or a command line interface) to allow a user to search the indexed autosupport data. The user may search the indexed autosupport data for a predetermined type of information useful in debugging an error in the storage appliance 310. For example, the user may input the word "PANIC" to cause the secure support server 320 to search the indexed autosupport data for any log files containing the word "PANIC." In another example, the user may enter a particular hostname to cause the secure support server 320 to search the indexed autosupport data for any log files generated by storage appliances having a host with that name.

After searching the indexed autosupport data in response to the user request, the secure support server 320 queues up the portion of autosupport data meeting the search criteria in the database 330. To allow the queued autosupport data to be displayed and/or to be filtered later, the secure support server 320 maps the queued autosupport data to a relational data model based on relationships between data elements within the queued autosupport data. A relational data model is a data structure reflective of relationships between various data elements of the autosupport data. In one embodiment, the relational data model includes an extensible markup language (XML) data type. Autosupport data mapped to the XML data type are converted into .xml files.

Referring back to the above example, suppose that there are three log files in the autosupport data including the word "PANIC" and the log files have the following IP addresses, "10.20.30.40," "10.20.30.50," and "10.20.30.40," respectively. Based on the IP addresses, one can determine that the first and the third log files are from the same storage appliance while the second log file is from a different storage appliance. These log files may be mapped to a relational data model by assigning some arbitrary keys (also referred to as tags) to the log files based on their relationships. The arbitrary keys may be values randomly selected from a group of predetermined values (such as a letter randomly selected from the alphabets) or values randomly generated (such as a randomly generated number). For instance, the key "A" may be assigned to both the first and the third log files and the key "B" may be assigned to the second log file, because the first and the third log files are from the same storage appliance while the second log file is from a different storage appliance.

In some embodiments, the user interface module 340 generates another user interface to allow the user to filter out contents of some data elements from the queued autosupport data. However, in order for the filtered autosupport data to be useful in servicing or debugging the system 300, the relational information in the autosupport data is retained. Relational information of the autosupport data is information relevant to relationships between various data elements of the autosupport data. Relational integrity of the autosupport data is a quality or characteristic of the autosupport data reflective of how well the relational information of the autosupport data is maintained. For example, the more relational information of the autosupport data is maintained, the better the relational integrity of the autosupport data is. To illustrate one way to maintain relational information in the autosupport data, the above example is considered again. In the above example, the relational information in the log files having the word "PANIC" includes the fact that the first and the third entries are from a first storage appliance and the second entry is from a second storage appliance, where the first and the second storage appliances have distinct IP addresses. Suppose the user wants to filter out the IP addresses from the autosupport data, the secure support server 320 may remove the IP addresses and replace them with an identical entry or value, such as "XXXXXX." Note that although the actual IP addresses have been removed by filtering, it is still possible to determine that the first and the third log files are from the same storage appliance while the second log file is from a different storage appliance because of the arbitrary keys (i.e., A and B) assigned to these log files during the mapping of the autosupport data to the relational data model. The fact that the first and the third log files are from the same storage appliance while the second log file is from a different storage appliance is one example of the relational information of the log files. In other words, the relational information of the log files is not lost after the filtering. Therefore, the relational integrity of the autosupport data is protected by the mapping from the filtering.

After filtering the queued autosupport data, the secure support server 320 sends the filtered autosupport data with the arbitrary keys assigned out of the system 300. For example, the secure support server 320 may send the filtered autosupport data to a portal server 350 over a public network (e.g., the Internet). The portal server 350 may be a server maintained by a storage appliance vendor. One example of such a portal server 350 is the NetApp On the Web (NOW) server provided by Network Appliance, Inc. in Sunnyvale, Calif. Through the portal server 350, the filtered autosupport data may be forwarded to a remote servicing center operated by the vendor of the storage appliance 310 over the public network. Using the filtered autosupport data, the staff at the remote servicing center may debug the problems in the system 300 without receiving the sensitive or confidential information the user filtered out.

FIGS. 4A-4C illustrate flow diagrams of some embodiments of a process to handle autosupport data in a networked storage system. The process is performed by processing logic that comprises hardware (e.g., circuitry, dedicated logic, etc.), software (such as is run on a general-purpose computer system or a dedicated machine, such as the secure support server 320 in FIG. 3), or a combination of both.

Referring to FIG. 4A, processing logic receives autosupport data from a storage appliance (processing block 410), such as the storage appliance 310 in FIG. 3. Processing logic then indexes the autosupport data (processing block 412). Indexing the autosupport data makes the autosupport data easier to search. In some cases, users may want to filter out contents of data elements containing a predetermined term. However, the users may not know which data elements contain the predetermined term. By indexing the autosupport data, the user can easily search the autosupport data to identify the data elements that contain the predetermined term.

FIG. 4B illustrates one embodiment of a process to search and to map autosupport data. Referring to FIG. 4B, processing logic searches the autosupport data to find a subset of the autosupport data matching the search criterion in response to the user request (processing block 414). For example, processing logic may go through each log file in the autosupport data to check one or more fields in each log file to determine if the value(s) in the one or more fields matches the search criterion. Processing logic then queues up the found subset of autosupport data in a database (processing block 416). The database may include a flat-file database. A flat-file database typically includes a single table to store data, which is relatively simpler than a relational database.

After queuing the autosupport data in the database, processing logic maps the autosupport data to a relational data model (processing block 418). The mapping is based on relationships between various data elements of the autosupport data. During the mapping, a unique key may be assigned to some data elements based on the relationships between these data elements. Mapping the autosupport data to the relational data model protects relational information of the autosupport data from being destroyed or lost during data filtering.

In some embodiments, processing logic generates a graphical user interface (GUI) to display the mapped autosupport data for the user to view (processing block 420). The user may review the mapped autosupport data via the GUI. Based on the user's review, the user may request to filter out contents of some data elements in the autosupport data.

FIG. 4C illustrates one embodiment of a process to filter autosupport data. Processing logic generates a GUI for the user to enter a request to filter the autosupport data as well as the criteria for the filtering (processing block 422). In some embodiments, the user identifies a subset of the autosupport data and requests to apply the filtering criteria to the subset of the autosupport data. Alternatively, the user may request to apply the filtering criteria to all of the autosupport data available.

In response to the user request to filter the autosupport data, processing logic filters out contents of the appropriate data elements in the mapped autosupport data while retaining the relational information of the autosupport data (processing block 424). In some embodiments, processing logic generates another GUI to display the filtered autosupport data. The user can view the filtered autosupport data via the GUI to verify that the appropriate contents have been filtered. If desired, the user may request additional filtering to be applied to the autosupport data. Note that the filtering and verification may be repeated as many times as the user desired. After completing the filtering of the autosupport data, processing logic transmits the filtered autosupport data to a public network (processing block 426). Through the public network, the filtered autosupport data may be forwarded to a vendor of the storage appliance to be used in servicing the storage appliance.

FIG. 5 illustrates one embodiment of a GUI to display autosupport data and to allow users to enter filter requests and criteria. The GUI 500 may have been generated by a secure support server (e.g., the secure support server 320 in FIG. 3) in a networked storage system. According to one embodiment, the GUI 500 may be generated by a PERL Common Gateway Interface (CGI) application. The secure support server receives autosupport data from storage appliances (e.g., the storage appliances 310 in FIG. 3) in the networked storage system. In some embodiments, the secure support server maps the autosupport data to a relational data model. For instance, the secure support server maps the autosupport data to an XML schema data type to convert the autosupport data into a number of XML files 510. The XML files 510 have been queued up and displayed in the GUI 500. In the current example, each XML file includes a hostname, a system identification (ID), a mode, and a subject description.

Referring to FIG. 5, a filter has been applied to the first XML file 511 and the fourth XML file 514 in the queue to remove the content of the hostname. As illustrated in FIG. 5, the contents of the host name have been replaced by a string of "X". As a result, the first and the fourth XML files 511 and 514 have the same hostnames, i.e., "XXXXXXXXX" after the filter has been applied. However, the XML files 511 and 514 may or may not come from the same host despite the identical hostnames. To determine if the XML files 511 and 514 come from the same host after the filtering, one may look into the keys assigned to the XML files 511 and 514 during mapping of the autosupport data to the XML files 511 and 514. Note that the keys have also been transmitted to the recipient with the XML files 511 and 514. As discussed above, the keys have been assigned based on the relationship of interest is whether the data elements are from the same host. An identical key is assigned to both XML files 511 and 514 if they are both from the same host. Otherwise, different keys are assigned to the XML files 511 and 514.

In one embodiment, the user interface 500 further provides some user interface controls (e.g., buttons 523 and 525) to the user to allow the user to further filter and/or search the autosupport data in the queue. The field 521 and the buttons 523 and 525 are underneath the queue of XML files 510. For example, the user may enter a criterion in the field 521 and click on the "Search" button 523 or the "Apply Filters" button 525 to search or to filter the autosupport data based on the criterion entered in the field 521.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:

receiving autosupport data that includes a plurality of autosupport data items;

for each autosupport data item, identifying a storage appliance that generated the autosupport data item;

generating a unique key for each storage appliance that generated an autosupport data item;

mapping autosupport data from the plurality of autosupport data items to a data model based on relationships between a plurality of data elements in the autosupport data items, wherein the mapping includes assigning, to each autosupport data item, the unique key associated with the storage appliance that generated the autosupport data item;

filtering, by a secure support server, the autosupport data using a criterion provided by a user, with relational integrity of the autosupport data protected, the filtering comprising:

identifying the plurality of data elements in the autosupport data items based on the criterion; and removing contents of the plurality of data elements from the auto-support data items, wherein the removed contents include sensitive system environment related information, including at least one of an internet protocol address, configuration information and hostname; and exporting the filtered autosupport data to a public network, wherein the unique key included in at least two of the plurality of autosupport data items indicates that the at least two autosupport data items have been generated by the same storage appliance.

2. The method of claim 1, further comprising:
retaining relational information of the plurality of data elements in the autosupport data to protect the relational integrity of the autosupport data.

3. The method of claim 1, further comprising:
storing the autosupport data in a database.

4. The method of claim 3, wherein storing the autosupport data in the database comprises:
queuing the auto-support data with other auto-support data in the database.

5. The method of claim 4, further comprising:
generating a graphical user interface to display the queued auto-support data in the database, wherein the database includes a flat-file database.

6. The method of claim 1, wherein the relational data model comprises an extensible markup language (XML) schema data type.

7. The method of claim 1, wherein the autosupport data includes configuration information and operational statistics of the storage appliance.

8. The method of claim 1, further comprising:
displaying the filtered autosupport data;
receiving additional filtering criteria from the user; and
filtering the autosupport data again using the additional criteria.

9. The method of claim 1, further comprising:
indexing a plurality of data elements in the autosupport data to make the autosupport data searchable.

10. An apparatus comprising:
a network adaptor to be coupled to a storage appliance to receive autosupport data from the storage appliance, the autosupport data including a plurality of autosupport data items; and
a processor, coupled to the network adaptor, configured to:
generate one or more unique keys for the storage appliance;
map the autosupport data from the plurality of autosupport data items to a data model based on relationships between a plurality of data elements in the autosupport data items, wherein the mapping includes assigning the one or more unique keys to the autosupport data items based on the relationships;
filter the autosupport data using a criterion provided by a user, with relational integrity of the autosupport data protected, the filtering including identifying a plurality of data elements in the autosupport data items based on the criterion, and removing contents of the plurality of data elements from the auto-support data items, wherein the removed contents include sensitive system environment related information, including at least one of an internet protocol address, configuration information, and hostname; and
export the filtered autosupport data to a public network, wherein the one or more unique keys included in the plurality of autosupport data items indicates that the plurality of autosupport data items have been generated by a single storage appliance.

11. The apparatus of claim 9, further comprising:
a network interlace coupled to the processor to export the filtered autosupport data to a public network.

12. The apparatus of claim 10, wherein the processor is further configured to generate a first graphical user interface to receive the criterion from the user.

13. The apparatus of claim 12, wherein the processor is further configured to generate a second graphical user interface to display the mapped auto-support data.

14. The apparatus of claim 10, wherein the autosupport data includes configuration information and operational statistics of the storage appliance.

15. A system comprising the apparatus of claim 10, wherein the system further comprises:
a flat-file database coupled to the processor to store the mapped auto-support data.

16. The system of claim 15, further comprising the storage appliance.

17. The system of claim 15, wherein the storage appliances is configured to send the autosupport data to the processor via electronic mail.

18. A machine-accessible storage medium that stores executable instructions to cause a processor to perform operations comprising:
searching autosupport data that includes a plurality of autosupport data items from a storage appliance to identify a subset of the autosupport data items in response to a user request;
generating a unique key for the storage appliance;
assigning the unique key associated with the storage appliance to each autosupport data item in the subset;
mapping the subset of the plurality of autosupport data items to a relational data model based on the unique key; and
filtering selected data elements from the mapped autosupport data items based on criteria provided by a user while retaining relational information of the mapped autosupport data, the filtering comprising:
identifying a plurality of data elements in the autosupport data items based on the criterion; and
removing contents of the plurality of data elements from the auto-support data items, wherein the removed contents include sensitive system environment related information, including at least one of an internet protocol address, configuration information and hostname; and
exporting the filtered autosupport data to a public network, wherein the unique key included in the plurality of autosupport data items indicates to a recipient that the plurality of autosupport data items have been generated by a single storage appliance.

19. The machine-accessible storage medium of claim 18, wherein the relational data model comprises an extensible markup language (XML) schema data type.

20. The machine-accessible storage medium of claim 18, wherein the operations further comprise:
exporting the filtered autosupport data to a public network to be uploaded to a portal server over the public network.

21. An apparatus comprising:
means for generating one or more unique keys for a storage appliance;
means for assigning the one or more unique keys to unstructured autosupport data based on relationships established in a relational data model;
means for maintaining relational integrity of unstructured autosupport data from the storage appliance using the one or more unique keys assigned to the autosupport data;
a secure support server including means for removing content of a predetermined data element of the autosupport data before exporting the autosupport data to a public network, wherein the removed content includes sensitive system environment related information, including at least one of an internet protocol address, configuration information, and hostname; and means for exporting the autosupport data to a public network, wherein the one or more unique keys included in the autosupport data indicates that the autosupport data has been generated by a single storage appliance.

22. The method of claim 1, wherein the sensitive data includes an Internet protocol address.

23. The apparatus of claim 10, wherein the sensitive data includes an Internet protocol address.

24. The machine-accessible storage medium of claim 18, wherein the sensitive data includes an Internet protocol address.

* * * * *